United States Patent
Mirzayi et al.

(10) Patent No.: US 6,905,603 B2
(45) Date of Patent: Jun. 14, 2005

(54) TREATMENT OF CONTAMINATED ACTIVATED CHARCOAL

(76) Inventors: Behzad Mirzayi, 8228 S. Jackson St., Littleton, CO (US) 80122; Mery C. Robinson, 6965 El Camino Real, Number 105-279, Carlsbad, CA (US) 92009; Alvin J. Smith, 4379 Modoc Rd., Santa Barbara, CA (US) 93110; Dominic J. Colasito, 2707 Panorama Dr., Bakersfield, CA (US) 91101

(*) Notice: Subject to any disclaimer, the term of this patent is extended or adjusted under 35 U.S.C. 154(b) by 412 days.

(21) Appl. No.: 10/052,295

(22) Filed: Jan. 18, 2002

(65) Prior Publication Data

US 2003/0136734 A1 Jul. 24, 2003

(51) Int. Cl.⁷ .................................................. C02F 3/00
(52) U.S. Cl. ...................... 210/615; 210/616; 210/617; 210/150
(58) Field of Search ................................ 210/615–617, 210/150

(56) References Cited

U.S. PATENT DOCUMENTS

| | | | | |
|---|---|---|---|---|
| 4,237,002 A | * | 12/1980 | Strudgeon et al. | 210/631 |
| 5,334,533 A | | 8/1994 | Colasito et al. | |
| 5,496,785 A | * | 3/1996 | Abler | 502/180 |
| 5,746,914 A | * | 5/1998 | Hanna et al. | 210/266 |
| 5,863,858 A | * | 1/1999 | Miller et al. | 502/411 |
| 6,177,005 B1 | | 1/2001 | Yamasaki et al. | |
| 6,471,864 B1 | | 10/2002 | Sublette et al. | |

* cited by examiner

Primary Examiner—Chester T. Barry
(74) Attorney, Agent, or Firm—William W. Haefliger

(57) ABSTRACT

The method of providing for a fluid treatment, that includes providing a treatment zone containing granular activated charcoal, and providing a stream of water containing nutrients, contaminant degrading microbes and dissolved oxygen, and introducing the stream to a treatment zone to effect adsorption of nutrients and microbes onto the granular activated charcoal, thereby to provide a contaminant treatment matrix, whereby contaminant in fluid flow through the matrix is reduced.

13 Claims, 2 Drawing Sheets

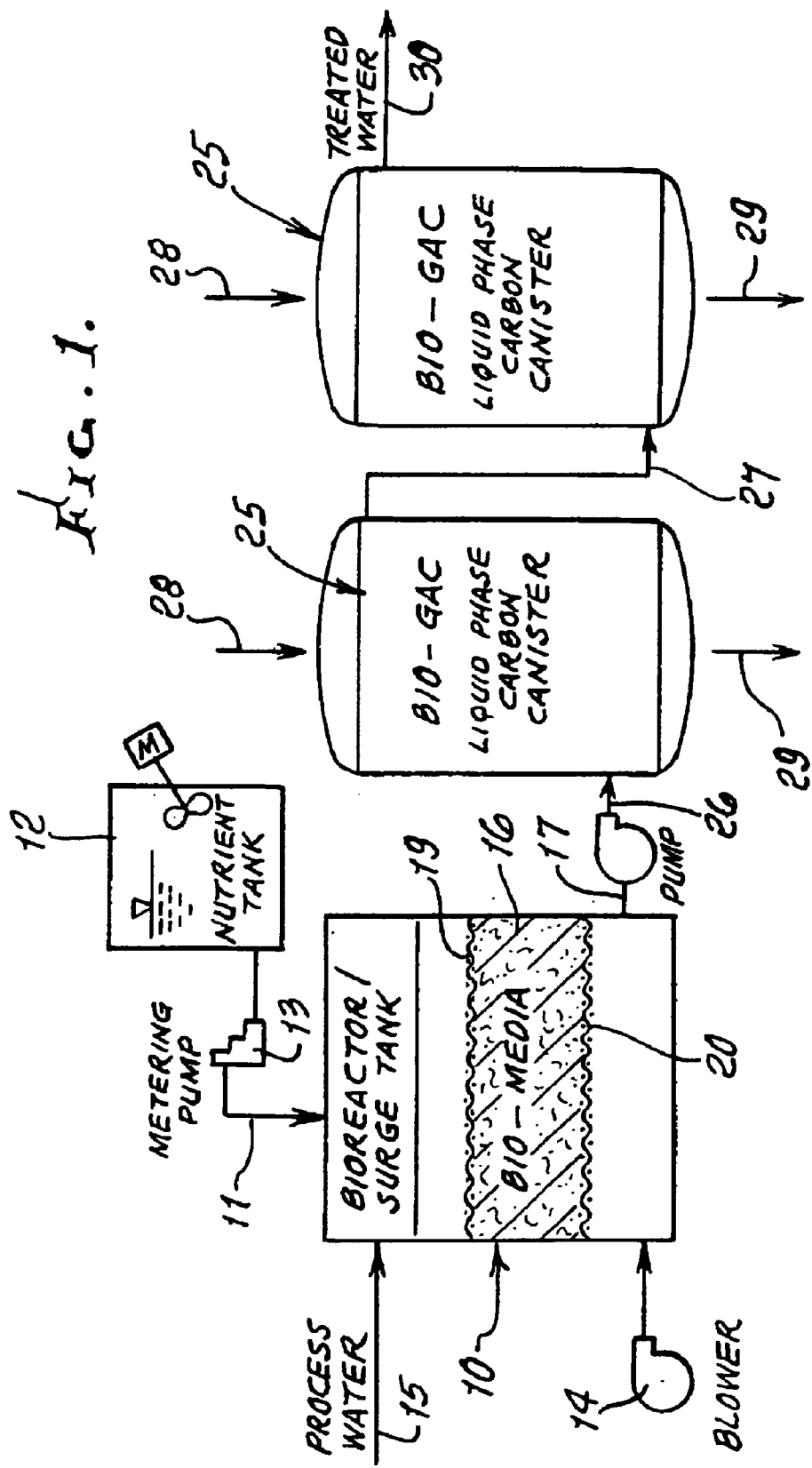

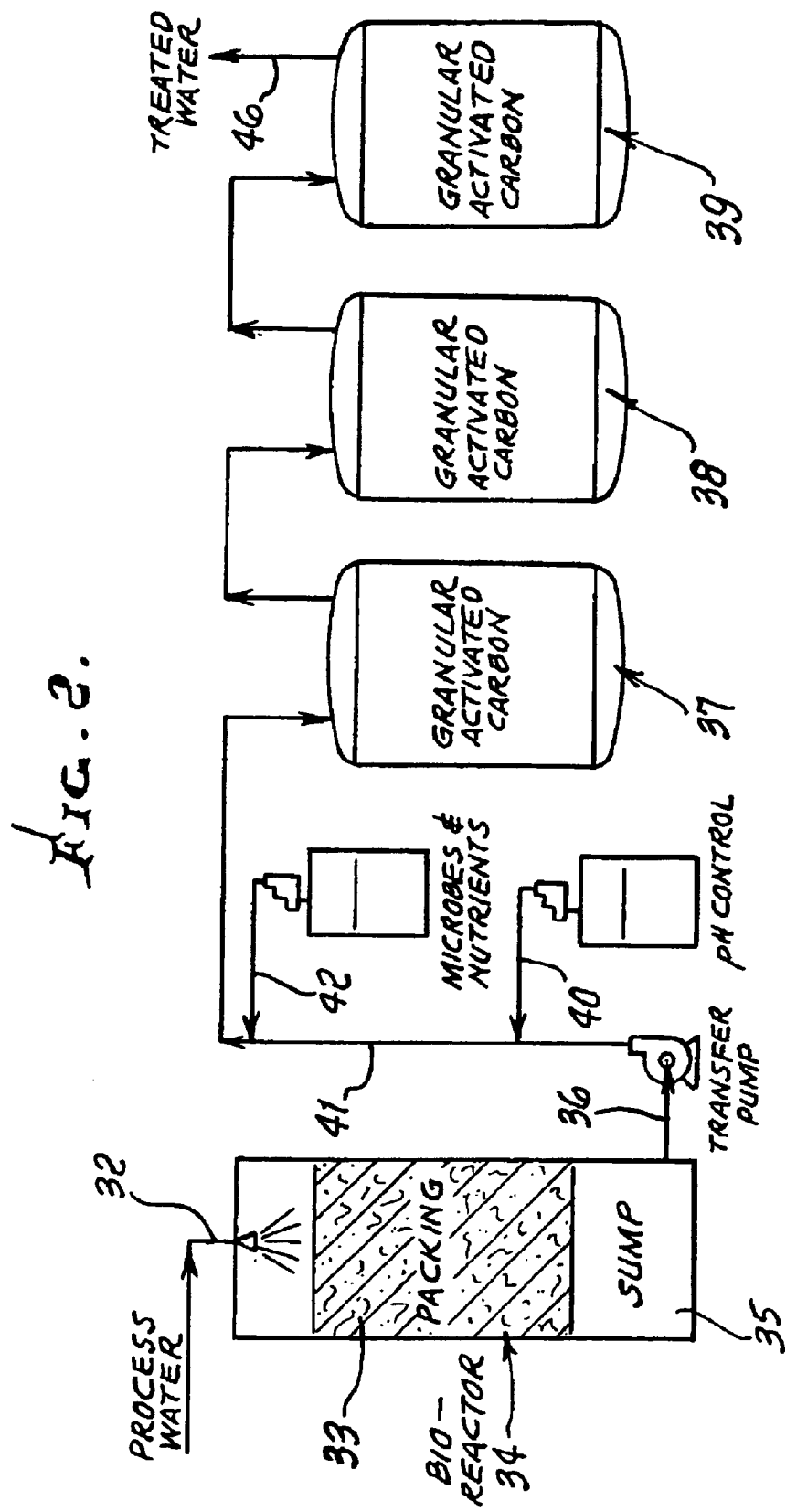

TREATMENT OF CONTAMINATED ACTIVATED CHARCOAL

BACKGROUND OF THE INVENTION

This invention relates generally to treatment of granular activated charcoal (GAC) filtration systems; and more particularly it concerns use of micro-organisms for removal of contaminating hydrocarbons from such systems.

"Liquid phase" GAC systems are typically used as water filtration media to adsorb toxic chemicals found in wastewater and extracted groundwater plumes. Treated water typically must meet Clean Water Act standards for discharge into sewers or streams. GAC becomes spent when its adsorption potentials are met and breakthrough of toxics occurs. There is need for apparatus and methods that not only extend service life, but also, actively effect scrubbing of the effluent water stream to mitigate GAC breakthrough of daughter degradation compounds such as Tri-Butyl Alcohol (TBA), which is created in the breakdown of Methyl Tertiary Butyl Ether (MTBE), the clean fuels additive found in gasoline.

More generally, granular activated carbon or charcoal (GAC) is used extensively to treat water, wastewater and groundwater at remediation sites contaminated with various organic pollutants such as petroleum hydrocarbons including BTEX and MTBE, chlorinated solvents, volatile and semi-volatile organic compounds. Historically, this technology has been used because it is effective, predictable, economical, and simple to implement at a variety of sites and operating conditions. Recently, however, increasing regeneration costs and the regulation of compounds that have lower adsorption efficiencies has made traditional GAC systems less economical. For example, hundreds of sites across the United States and overseas with groundwater impacted by MTBE, and its daughter products including TBA, must be remediated to near non-detect levels, but GAC has a very low adsorption efficiency for MTBE and TBA. The result is that MTBE and TBA breakthrough occurs very rapidly and carbon change-out frequencies must increase.

Such toxic chemicals include for example tri-butyl alcohol created in the breakdown of MTBE, Methyl Tertiary Butyl Ether, the clean fuels additive found in gasoline.

As noted, granular activated carbon (GAC) is used extensively to treat groundwater and vapor streams at remediation sites and industrial facilities across the U.S. and abroad. To date, the standard practice has been to replace spent carbon with virgin carbon, or to have the carbon thermally regenerated. Replacing spent carbon with virgin carbon is more expensive, but is often done since the alternative thermal regeneration breaks down the carbon, resulting in more "fines". The cost of thermal regeneration has also been increasing due to increasing energy costs. At the same time, the increasing presence of MTBE and its daughter products like TBA have resulted in increasing carbon usage rates and expense, since GAC has a lower adsorption efficiency for these compounds.

SUMMARY OF THE INVENTION

It is a major object of the invention to provide an improved method for fluid treatment, that includes a) providing a treatment zone containing granular activated charcoal, and b) providing a stream of water containing nutrients, contaminant degrading microbes and dissolved oxygen, and c) introducing that stream to the treatment zone to effect adsorption of nutrients and microbes onto the granular activated charcoal, thereby to provide a contaminant treatment matrix.

An important advantage of such a method, and its associated system, over traditional granular activated charcoal per se treatment of fluid such as water, is that the system is very effective in the treatment of hydrocarbon contaminants such as MTBE and its byproducts, resulting in typical cost savings of up to 50 percent relative to traditional GAC systems.

The surface of granular-activated carbon adsorbs organic compounds, such as MTBE, and acts as a "storage site" to buffer variations in influent concentration. The surface is also an excellent attachment medium for bacteria. This allows the bacteria to thrive in the presence of uniform aqueous concentrations of MTBE and other organic compounds.

A further advantage lies in elimination of need for thermal desorption facilities which roast toxics from the GAC, causing indirect damage up to 25% of the GAC by volume, and necessitating addition of virgin GAC to blend back to specified adsorption levels or properties. The present on-site process can be operated at one-third to one-half the cost of conventional thermal reactivation.

Another object includes provision of a process wherein microbial blends are employed to inoculate bacteria directly upon out-of-service and spent Granular Activated Carbon from both "liquid phase" and "vapor phase" filtration systems. "Liquid phase" GAC systems are typically used as water filtration media to adsorb toxic chemicals found in wastewater and extracted groundwater plumes. "Vapor phase" GAC systems are typically used to scrub or reduce airborne or gas-borne toxics that vent from filling and emptying large storage tanks and process treatment vessels as found in petroleum refineries and tank farms.

A further object includes provision of microbe adsorbing granular activated charcoal in a treatment zone, where the charcoal has one of the following matrix-like forms:

i) pellets ii) a mat or mats iii) fabric iv) a support matrix v) adsorption media.

Yet another object includes provision of a process that includes passing treatable aqueous fluid into contact with such matrix adsorbed substances, in a treatment path, and recovering treated fluid from that path. Such fluid typically includes water. As referred to, the GAC is typically disposed as a porous support media for such nutrients and microbes.

An additional object includes adjusting the pH of the fluid to between 6.0 and 8.5 prior to its introduction to the matrix; and also adjusting the temperature of the fluid to a level less than 110° F., prior to the introducing step.

Further objects include provision of a multi-tank system containing GAC, and connected in series for reception of fluid to be treated, and microbial nutrients to be adsorbed on the GAC. At least one of the upstream tanks typically and preferably contains seeding microbes to be carried downstream onto the GAC in successive tanks. Porous synthetic resinous ball-like "seeders" may be employed in the upstream tank to disperse microbes into the flow, the microbes having been deposited on the seeders.

These and other objects and advantages of the invention, as well as the details of an illustrative embodiment, will be more fully understood from the following specification and drawings, in which:

DRAWING DESCRIPTION

FIG. 1 is a preferred system diagram;

FIG. 2 is another system diagram.

DETAILED DESCRIPTION

Referring first to FIG. 1, a bioreactor surge tank is shown at 10. Nutrients and microbes are supplied to the upper interior of tank 10 at 11 from a tank 12, via a metering pump 13; and air or oxygen is supplied to the lower interior of the tank 10, as via a blower 14, to increase dissolved $O_2$ levels in the fluid in the tank. Process water, conditioned as to pH level and temperature, is supplied at 15 to the tank upper interior.

The reactor 10 contains a bio-support matrix or bed 16 through which process water flows downwardly to an exit at 17. The matrix 16 serves to maintain an active or "healthy" microbial population to ensure that a portion of the microbes will be picked up and carried by the water flowing through 16 and to and from exit 17, for seeding the granular activated charcoal GAC in a subsequent vessel or vessels. Matrix or bed 16 may advantageously consist of a mass of synthetic resinous (plastic) pieces such as porous balls, held in position as for example by upper and lower screens at 19 and 20. The $O_2$ supply may include a fine-bubble aeration device or devices, or by adding or supplying hydrogen peroxide or other oxidizer.

Usable bacteria as for treatment (for example consumption) of hydrocarbon contaminants, include one or more of: Achromobacter, Arthrobacter, Aspergillus, Bacillus, Candida, Cladosporium, Corynebacterium, Myrothecium, Nocardia, Punicillium, Phialophora, Pseudomonas, Rhodotorula, Streptomyces, Trichoderma, and a blend of Anerobic and Faculative Organisms.

Process water flows through the interstices in and between the plastic pieces or balls in the matrix or mass to entrain bacteria growing in the matrix, by virtue of the nutrient supply. Nutrient material may include one or more of the following:

simple sugars
  mono-potassium phosphate
  nitrogen

The second step in the system employs one or more treatment vessels or canisters 25 to which process fluid such as water is supplied. See paths 26 and 27.

The process water containing nutrients, microbes, and dissolved oxygen enters the vessels where a carbon matrix adsorbs and concentrates the organic compounds carried in the upward flow in the vessels. The carbon matrix can consist of GAC or other carbon based products, including pellets, mats, fabrics, or a combination of carbon materials. The carbon material acts as an adsorption media for the organic compounds and as a support matrix for the microbes.

The microbes adsorbed onto the GAC matrix granules consume hydrocarbon material, such as MTBE, in the flowing process water, in the vessels. The matrix typically fills the vessels, as schematically indicated by in-fill arrows 28. The GAC material from which hydrocarbon has been removed by consumption (microbial consumption of hydrocarbon to produce $CO_2$ and water) is periodically removed from the vessels, as schematically indicated by arrows 29. Treated fluid, or water, leaves the vessels as indicated at 30, for return flow in a loop to 15.

The bioreactor and Bio-GAC™ vessels must be sized to ensure that adequate retention time is available for the adsorption and microbial processes to be effective. High flow velocities tend to wash the microbes through the vessels, and prevent the development of suitable microbial populations to be effective on the water waste stream being treated, and removed at 30.

FIG. 2 is a diagram illustrative of an alternate system. Process water received at 32 is sprayed on packing 33 in a bioreactor vessel 34. Packing 32 corresponds to the bed 16 in FIG. 1. Process water draining to sump 35 in vessel 34 is removed at 36 and pumped to the reactors 37, 38, and 39, corresponding to reactors 25. pH control liquid is added at 40 to flow path 41; and microbes and nutrients may be added at 42 to the flow 41. After passing through the treatment tanks 37–39, process water leaves at 46, for use, or for return flow to 32.

The disclosed system or systems can be used for a variety of process streams containing organic compounds. In order to protect the microbes in the system, the groundwater or process water must be conditioned prior to entering the system. As referred to, the pH must be adjusted to between 6.0 and 8.5 and the temperature should be less than 110 degrees Fahrenheit.

Typically, the process restores GAC to 95% or more of its original adsorption value or values, without the need for transport handling.

A variation of the process further contemplates that the spent GAC to be treated be placed in a gravity feed hopper engineered to drain at an optimum rate of flow dependent upon GAC grain sizing and available treatment vessel size. Spray nozzles sized at 1–3 GPM are suspended above the spent GAC in a manifold pattern with overlapping radius in a treatment zone to assure maximum surface area coverage and to minimize the chance for treatment effluent channeling and formation of erosion gaps within the body of GAC deposited in the treatment vessel. Such a system or process employs the application of microbial blends, surfactants, nutrients and water applied through a series of spray nozzles that continually recycle the treatment blend in a closed loop. Gravity fed treatment blend is recovered using a receiving tank under or adjacent the treatment vessel plumbed to a water pump that feeds the spray nozzles atop the GAC treatment tank. Once GAC reactivation levels are achieved, liquid phase GAC can be placed directly back into service. Vapor phase GAC must be dried to specified moisture standards before being placed back into service. Conventional electric fan blowers plumbed directly into the treatment container force air through the GAC to achieve the proper moisture content.

The above system can be employed to treat water containing any of the following substances:

TABLE 1

Benzene
Bromobenzene
Bromochloromethane
Bromodichloromethane
Bromoform
Bromomethane
n-Butylbenzene
sec-Butylbenzene
tert-Butylbenzene
Carbon tetrachloride
Chlorobenzene
Chloroethane
Chloroform
Chloromethane TABLE 1-continued 2-Chlorotoluene
4-Chlorotoluene
1,2-Dibromo-3-chloropropane
Dibromochloromethane
1,2-Dibromoethane (EDB)
Dibromomethane
1,2-Dichlorobenzene
1,3-Dichlorobenzene
1,4-Dichlorobenzene
Dichlorodifluoromethane
1,1-Dichloroethane
1,2-Dichloroethane
1,1-Dichloroethene
cis-1,2-Dichloroethene
trans-1,2-Dichloroethene
1,2-Dichloropropane
1,3-Dichloropropane
2,2-Dichloropropane
1,1-Dichloropropene
Diisopropyl ether
Ethyl benzene
Hexachloro-1,3-butadiene
Isopropylbenzene (Cumene)
p-Isopropyltoluene
Methylene chloride
Methyl-tert-butyl ether
Naphthalene
n-Propylbenzene
Styrene
1,1,1,2-Tetrachloroethane
1,1,2,2-Tetrachloroethane
Tetrachloroethene
Toluene
1,2,3-Trichlorobenzene
1,2,4-Trichlorobenzene
1,1,1-Trichloroethane
1,1,2-Trichloroethane
Trichloroethene
Trichlorofluoromethane
1,2,3-Trichloropropane
1,2,4-Trimethylbenzene
1,3,5-Trimethylbenzene
Vinyl chloride
m&p-Xylene
o-Xylene
Toluene-d8 (S)

The system can be used in the following industries for treatment of water, wastewater, and impacted groundwater subject to the Toxic Substances Control Act (TSCA); Clean Air Act (CAA); Comprehensive Environmental Response, Compensation, and Liability Act (CERCLA); the Resource Conservation and Recovery Act (RCRA) and the Cleanwater Act (CWA) including, but not limited to the equivalent state and local requirements. The typical industries with potential beneficial use are:

Local potable water treatment companies, boards, districts

Oil and gas production, transportation, pipeline, bulking, refining, distribution, retail and gas stations]

Commercial and industrial facilities with waste water production, and/or NPDES permit requirements to treat facility discharges Chemical and petrochemical manufacturing facilities Groundwater remediation sites.

In a large-scale test, virgin carbon was loaded into a bioreactor consisting of two 55-gallon drums and exposed to water containing MTBE until the carbon was saturated with MTBE. At this point, microbes were added to the reactors and the system operation was continued by re-circulating water at flow rates of up to 2 gallons per minute. MTBE is added to the feed tank to create MTBE concentrations of approximately 150 mg/l. Continued operation and testing have shown that the bioreactor is effectively reducing MTBE concentrations by more than 99 percent as indicated in Table 1.

In the small-scale test, virgin carbon was loaded into two small columns and water containing approximately 180 mg/l MTBE was passed through the columns to simulate field conditions. After passing a volume of water through the columns equivalent to three times the adsorption capacity of the virgin carbon, samples were collected to determine if the system was continuing to adsorb MTBE or if the carbon was saturated. The results in Table 2 show that even after exposing the carbon to three times the adsorption capacity of the carbon, the system continued to adsorb the MTBE.

TABLE 1

Bio-GAC ™ Reactor Drum Test

| Sample ID | MTBE ($\mu$g/l) |
| --- | --- |
| Feed Water | 140,000 |
| Reactor 1 Effluent | 17,000 |
| Reactor 2 Effluent | 190 |

TABLE 2

Bio-GAC ™ Reactor Column Test

| Sample ID | MTBE ($\mu$g/l) |
| --- | --- |
| Feed Water | 200,000 |
| Column 1 Effluent | 30,000 |
| Column 2 Effluent | 6,000 |

The disclosure of U.S. Pat. No. 5,334,533, is incorporated herein, by reference.

We claim:

1. The method of providing for a fluid treatment, that includes
    a) providing a treatment zone containing granular activated charcoal, and
    b) providing a stream of water containing nutrients, contaminant degrading microbes and dissolved oxygen, and
    c) introducing said stream to said treatment zone to effect adsorption of said nutrients and microbes onto the granular activated charcoal, thereby to provide a contaminant treatment matrix, whereby contaminant in fluid flow through the matrix is reduced, and
    d) providing a seeding zone in matrix form upstream of said treatment zone and through which said stream of water is passed prior to its introduction to said treatment zone, to entrain microbes growing in the matrix to which nutrient is supplied.

2. The method of claim 1 wherein the granular activated charcoal in said zone has one of the following forms:
    i) pellets
    ii) a mat or mats
    iii) fabric
    iv) a support matrix
    v) adsorption media.

3. The method of claim 1 including passing a separate treatable aqueous fluid stream into contact with said granular activated charcoal, in a treatment path, and recovering treated fluid from said path.

4. The method of claim 1 wherein said granular activated charcoal is disposed as a porous support media for said nutrients and microbes.

5. The method of claim 3 including adjusting the pH of the separate fluid stream to between 6.0 and 8.5 prior to said introducing step.

6. The method of claim 5 including adjusting the temperature of said separate fluid stream to a level less than 110° F., prior to said introducing step.

7. The method of claim 1 including adjusting the temperature of said separate fluid stream to a level less than 110° F., prior to said introducing step.

8. The method of claim 1 including introducing $O_2$ to said treatment zone.

9. The method of claim 1 including aerating said treatment zone.

10. The method of claim 1 including providing a series of said treatment zones, and said seeding zone upstream of said treatment zones, and from which microbes are supplied in fluid flow to the treatment zones, for adsorption on the granular activated charcoal therein.

11. The method of claim 1 including passing a separate waste water stream containing toxic contaminants through said matrix, to reduce the concentration of said contaminants.

12. The method of claim 1 including passing gas transported toxic contaminants through said matrix, to reduce the concentration of said contaminants.

13. The method of providing for a fluid treatment, that includes a) providing a treatment zone containing granular activated charcoal in pellet form, and b) providing a stream of water containing nutrients, contaminant degrading microbes and dissolved oxygen, and c) introducing said stream to said treatment zone to effect adsorption of said nutrients and microbes onto the granular activated charcoal, thereby to provide a contaminant treatment matrix, whereby contaminant in fluid flow through the matrix is reduced, and d) providing a seeding zone in matrix form upstream of said treatment zone and through which said stream of water is passed prior to its introduction to said treatment zone, to entrain microbes growing in the matrix to which nutrient is supplied.

* * * * *